United States Patent [19]

Fujikawa

[11] 4,449,027
[45] May 15, 1984

[54] ELECTRODE MOUNTING DEVICE

[75] Inventor: Misao Fujikawa, Yokohama, Japan

[73] Assignee: Sodick Co., Ltd., Yokohama, Japan

[21] Appl. No.: 404,943

[22] Filed: Aug. 4, 1982

Related U.S. Application Data

[63] Continuation of Ser. No. 110,863, Jan. 9, 1980, abandoned.

[30] Foreign Application Priority Data

Feb. 6, 1979 [JP] Japan ................................ 54-13351

[51] Int. Cl.³ .......................... B23B 31/02; B23P 1/12
[52] U.S. Cl. ................................ 219/69 E; 279/1 ME
[58] Field of Search ................. 219/69 R, 69 E, 69 G; 279/1 R, 1 A, 1 L, 1 ME; 269/8, 9, 902; 407/70, 71, 101; 33/174 H

[56] References Cited

U.S. PATENT DOCUMENTS

| 1,889,897 | 12/1932 | Johansson | 33/174 H |
| 3,271,848 | 9/1966 | Montandon | 219/69 E |
| 3,711,105 | 1/1973 | Johanson | 219/69 E |

Primary Examiner—B. A. Reynolds
Assistant Examiner—Alfred S. Keve
Attorney, Agent, or Firm—James Creighton Wray

[57] ABSTRACT

In an electrode mounting device having a fixed coupling member and a removable coupling member, one coupling member has positioning projections and the other coupling member has a groove or grooves for receiving the positioning projections. These positioning projections are engaged with the grooves each other keeping a line contact or a point contact therebetween. As a result, if dust or chip is placed on the positioning projections or grooves of the coupling members, the coupling members can be accurately coupled. Furthermore, high precision is not necessarily required in preparation of the coupling members.

5 Claims, 6 Drawing Figures

ELECTRODE MOUNTING DEVICE

This application is a continuation of application Ser. No. 110,863, filed 1/9/80, now abandoned.

This invention relates to an electrode mounting device for an electrical discharge machining apparatus, and more particularly to an electrode mounting device capable of easily mounting an electrode, which has been preliminarily adjusted for positioning outside of the electrical discharge machining apparatus, on the electrical discharge machining in a desiredly positioned state.

In case where a work piece is machined by electrical discharge into a desired configuration using for example an electrical discharge machining apparatus, it is general to prepare a plurality of machining electrodes suitable for the desired configuration which electrodes are employed in various machining steps such as a roughing step, a semi finishing step and a finishing step, respectively, to attain the desired configuration. Thus, it is required to exchange the electrodes in each of the steps and mount the electrode required for the step to be carried out on a spindle so as to position at a desired angle with a reference axis. For this reason, an operation of the electrical discharge machining apparatus must be stopped prior to starting the respective machining steps for mounting and positioning the required machining electrode on the spindle. The operation for mounting and positioning the electrode takes a skill and a time. Thus, an effective operating time is greatly reduced due to the electrode mounting operation and an operating efficiency is significantly lowered. In order to obviate such disadvantages, there has been proposed a specific electrode mounting device which allows preliminary positioning operation of an electrode carried out separately from the electrical discharge machining apparatus and simple setting of the preliminarily positioned electrode onto the spindle to mount the electrode on the electrical discharge machining apparatus in the required state.

A known electrode mounting device of this type is so formed that projected portions formed on one of coupling members may be engaged with grooves formed on another coupling member in face-to-face contact to couple the two coupling members keeping a predetermined positional relationship therebetween. Therefore, if dust or chip adheres to the engaging faces, the coupling members are not snugly or accurately coupled in the desired positional relation. For this reason, the engaging faces must be always kept clean, and, in addition, accuracy is required in preparation of the coupling members. Thus, the manufacturing cost of the coupling members becomes inevitably high.

It is therefore an object of the present invention to provide an electrode mounting device free from the disadvantages involved in the conventional electrode mounting device and easy to manufacture.

It is another object of the present invention to provide an electrode mounting device which is capable of mounting an electrode simply and easily.

The machining electrode mounting device for an electrical discharge machining apparatus in accordance with the present invention comprises a first coupling member adapted to be fixed to the electrical discharge machining apparatus keeping a predetermined positional relation with the electrical discharge machining apparatus and a second coupling member for mounting a machining electrode thereon and adapted to be coupled with the first electrode member keeping a predetermined relationship therewith. Either one of the first and second coupling members has at least three positioning projections tapered towards the respective tip ends thereof, and the other of the first and second coupling members has a groove or grooves for receiving the three positioning projections, respectively, forming a point contact or a line contact therebetween. The electrode mounting device further comprises a locking means for locking the first coupling member to the second coupling member. In a preferred embodiment, the positioning projections are provided in the form of truncated conical projections disposed at angular intervals of 120° and the grooves for receiving the respective truncated conical projections are provided in the form of three V-shaped grooves corresponding to the shape of the projections and extending radially and provided at angular intervals of 120°. As an example of the locking means, there can be mentioned a locking device of magnetically attracting type which includes an electromagnetic coil provided on the first coupling member to lock the second coupling member to the first coupling member by a magnetic attracting force. Accordingly, coupling and decoupling of the coupling members can be easily attained simply by supplying and blocking an exciting current. In addition, since the positioning between the coupling members is achieved through engagement between the truncated conical projections and the respective V-shaped grooves, the projections and the V-shaped grooves are fitted to each other keeping a line contact therebetween. Therefore, if dust or chip are placed on the positioning projections or V-shaped grooves of the coupling members, the coupling members can be accurately coupled. Furthermore, since high precision is not necessarily required in preparation of the coupling members as compared with the case where coupling members are coupled in face-to-face contact, reduction in manufacturing cost can be expected.

Other features and advantages of the invention will be apparent from the following description taken in conjunction with the accompanying drawings in which.

Figure 1:
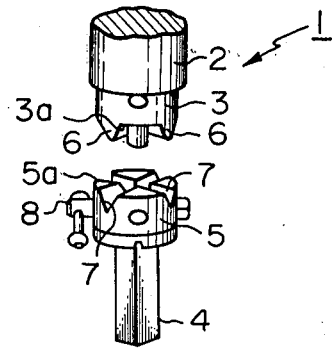
FIG. 1 is a perspective view of one example of known electrode mounting devices.

FIG. 1 illustrates a known electrode mounting device of this type. The conventional electrode mounting device 1 is comprised of a coupling member 3 fixed to a quill 2 of a machining apparatus body (not shown) and a coupling member 5 corresponding to the coupling member 3 and having an end on which an machining electrode 4 is mounted. The coupling member 3 has at an end face 3a thereof a plurality of angular portions 6, and the coupling member 5 has at an end face 5a thereof confronting the end face 3a grooves 7 snugly matable with the respective angular portions 6. Thus, the coupling member 5 is adapted to be fully engaged with the coupling member 3 in a predetermined relative position. Numeral 8 designates a clamping member for fixing the machining electrode 4 to the coupling member 5 in a predetermined relative position. The coupling member 3 and the coupling member 5 are bolted by a bolting mechanism (not shown) while being engaged with each other in the predetermined positional relation. Therefore, if another coupling member identical with the coupling member 3 is provided separately from the spindle of the electrical discharge machining apparatus and adjustment of electrode positioning is carried out using the coupling member provided outside of the electrical discharge machining apparatus, exchange of the machining electrodes can be carried out simply by fitting the coupling member 5, on which the positionally adjusted machining electrode, to the coupling member 3 set on the spindle 2. Thus, the operating efficiency of the electrical discharge machining apparatus can be highly increased. However, in the known electrode mounting device illustrated in FIG. 1, the peripheral faces of the angular portions formed on one of the coupling members are fully engaged in a face-to-face contact with the respective grooves formed on the other coupling member to set the coupling members in the predetermined relative position. Therefore, if dust or chip lies on the mating faces, it prevents proper fitting of the coupling members in the required positional relation. The known device thus has a disadvantage that the mating faces must be kept always cleaned and high accuracy is required in manufacturing of the coupling members, which increase the manufacturing cost.

Figure 2:
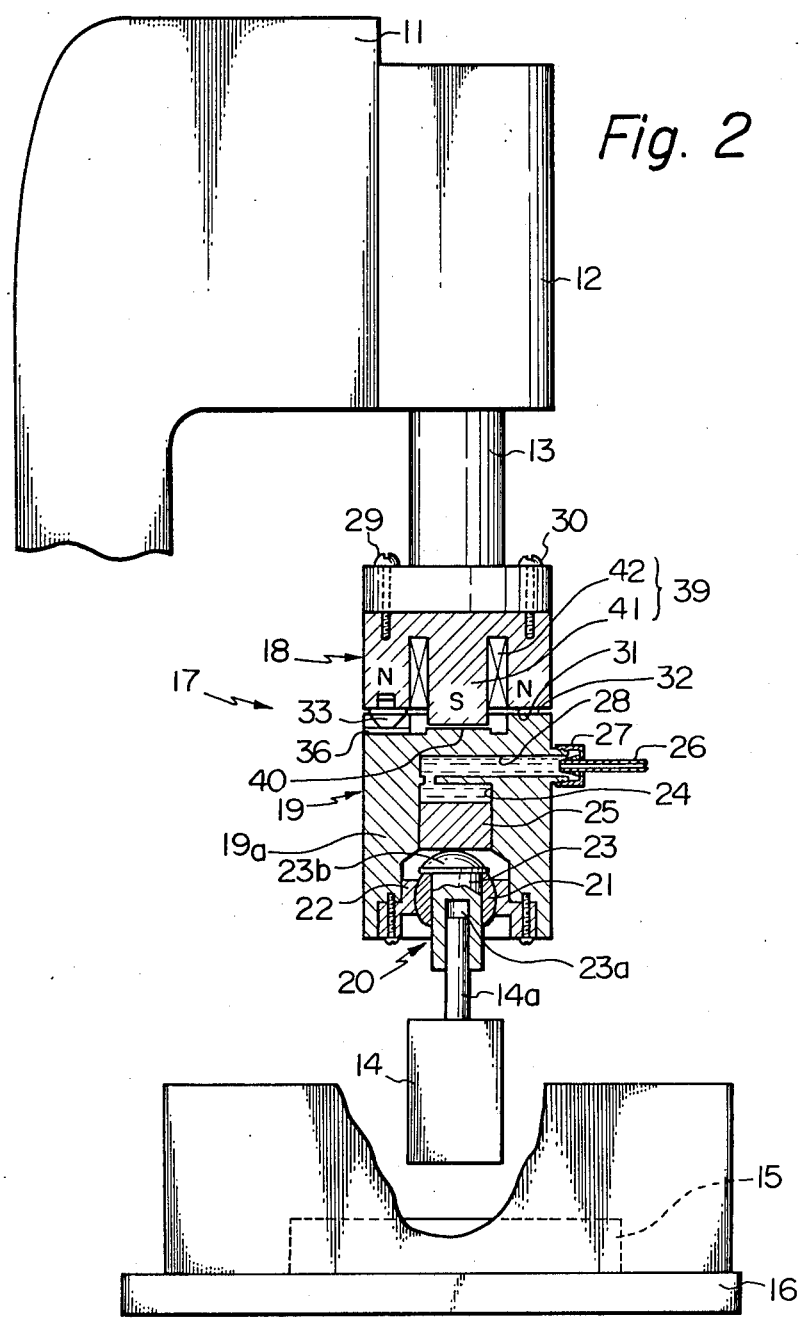
FIG. 2 is a partly cross sectional view of one embodiment of the present invention.

FIG. 2 illustrates a tool head portion of an electrical discharge machining apparatus equipped with an electrode mounting device in accordance with the present invention. The electrical discharge machining apparatus has a column 11 mounted on a base (not shown) and a tool head 12 is secured to the upper end of the column 11. The tool head 12 has a quill 13 which operatively supports an electrode 14. Various power operable means are provided in the tool head 12 including a stepping motor, and gears for driving the quill 13. In the operation, therefore, the electrode 14 can be moved towards and from a work 15 affixed to a table 16 slidably mounted on the base.

An electrode mounting device 17 is provided between the quill 13 and the electrode 14. The device 17 has a fixed coupling member 18 fixed by bolts to the lower end of the quill 13 in a specific positional relation to the quill 13 and a removable coupling member 19 matable with the fixed coupling member 18 and adapted to be removably coupled to the fixed coupling member 18 in a predetermined positional relation to the fixed coupling member 18.

An articulated joint portion 20 is provided at an end portion of the removable coupling member 19 for swingably mounting the electrode 14 on the removable coupling member 19. The articulated joint portion 20 comprises a spherical member 21 and a seat 22 having a configuration corresponding to the contour of the spherical member 21. A rod portion 14a of the electrode 14 is received in a recessed portion 23a of a mounting member 23 fitted in the spherical member 21 so that the electrode 14 is supported by the removable coupling member 19. An assembly comprised of the spherical member 21 and the seat 22 is screwed to a body 19a of the removable coupling member 19 as illustrated in FIG. 2. To lock the spherical member 21, a pressing piston 25 is liquid-tightly and vertically movably provided in a cylinder portion 24 of the body 19a and a pressurized oil is supplied to the cylinder portion 24 through a path formed by an oil pressure source (not shown), a pipe 26, a joint portion 27 and the body 19a. When the pressure within the cylinder portion 24 is raised by the oil pressure, the pressing piston 25 presses a head portion 23b of the mounting member 23 to lock the spherical member 21. Therefore, by locking the articulated joint portion 20 after the electrode 14 has been positioned in the required relative position to the removable coupling member 19, the electrode 14 is held in the required positional relation to the removable coupling member 19.

The fixed coupling member 18 is fixed to the lower face of the quill 13 by bolts 29 and 30. To couple the removable coupling member 19 to the fixed coupling member 19 keeping the required positional relationship therebetween wherever required, the fixed coupling member 18 has on a free end face 31 three truncated conical positioning projections. On the other hand, the removable coupling member 19 has on a free end face 32 thereof three V-shaped grooves for receiving the respective projections.

Figure 3:
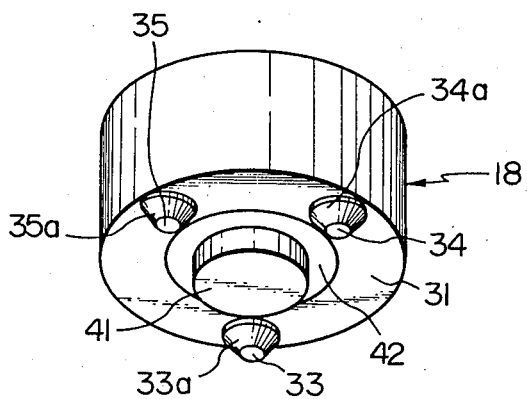
FIG. 3 is a perspective view of a fixed member illustrated in FIG. 2.
Figure 4:
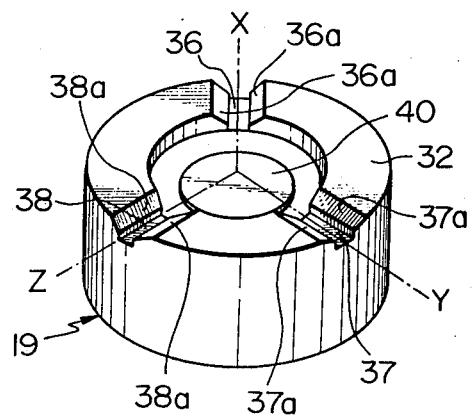
FIG. 4 is a perspective view of a removable member illustrated in FIG. 2.

FIGS. 3 and 4 illustrates details of the free end faces 31 and 32, respectively. In the illustrated embodiment, the three positioning projections 33, 34 and 35 are formed on the free end face 31 at angular intervals of 120°. On the other hand, the V-shaped grooves 36, 37 and 38 are formed on the free end face 32 so as to extend along three lines X, Y and Z extending radially from the center of the removable coupling member 19 at angular intervals of 120°. Therefore, the positioning projections 33, 34 and 35 are received within the corresponding V-shaped grooves 36, 37 and 39 respectively and peripheries 33a, 34a and 35a of the respective positioning projections are brought into line-contact with slanting faces 36a, 37a and 38a of the respective V-shaped grooves to position the removable coupling member 19 relative to the fixed coupling member 18 in the predetermined positional relation. In FIG. 2, only the projection 33 engaged with the V-shaped groove 36 is illustrated.

When the coupling members are mated, the V-shaped grooves are engaged with the corresponding positioning projections, respectively, forming line contacts therebetween as mentioned above. Therefore, if some dust or chip is laid on the surfaces of the V-shaped grooves or positioning projections, it does not prevent proper mounting of the coupling members. Furthermore, the surface finishment of the V-shaped grooves and positioning projections may be rougher as compared with the conventional coupling method wherein coupling members are mated in face-to-face contact, so that the manufacturing of the coupling members can become easier. In addition, when the positioning projections are fitted in the respective V-shaped grooves, since the positioning projections abut against the corresponding V-shaped grooves in line contacts, respectively, self-aligning force, i.e. a force for positioning the coupling members in such a relation that the axis of the fixed coupling member may be in parallel with the axis of the removable coupling member, acts on the removable coupling member simply by putting the projections into the respective V-shaped grooves. Thus, the coupling or decoupling of the removable member can be carried out very easily.

To keep the members in the desired mated state after the fixed coupling member 18 is coupled to the removable coupling member 19, the electrode mounting device 17 has an electromagnetic attracting device for locking the removable coupling member 19 to the fixed coupling member 18 in the desired mating state so as to keep the desired relationship between the coupling members. The electromagnetic attracting device comprises an electromagnet 39 provided in the fixed coupling member 18 and a magnetic member 40 fixed to the removable coupling member 19 for forming a return path of magnetic flux from the electromagnet 39.

The electromagnet 39 is comprised, as illustrated in FIG. 2, of a magnet core 41 formed integrally with the fixed coupling member 18 and a coil 42 wound around the magnet core 41. The magnet core 41 is adapted to be magnetized when an exciting current is externally supplied to the coil 42. Therefore, when the exciting current flows through the coil 42, the fixed coupling member 18 is magnetized in polarities of N and S for example as illustrated in FIG. 2, whereby the magnetic member 40 is attracted by an electromagnetic force to couple the removable coupling member 19 to the fixed coupling member 18. Although the members 18 and 19 are made of magnetic materials in the illustrated embodiment, the members 18 and 19 may be made of non-magnetic materials. In this case, an electromagnet and a magnetic member are provided as separate members in the members 18 and 19 respectively.

In accordance with the arrangement as mentioned above, since the removable coupling member 19 can be readily set onto the fixed coupling member 18 in the predetermined positional relation, a jig having a structure identical with that of the quill of the electrical discharge machining apparatus may be used to preliminarily position an electrode mounted on a removable coupling member so that exchange of electrodes can be done by bodily replacing an assembly of the removable member and an electrode mounted thereon. Thus, the electrode exchange can be effected without taking a substantial time, and the electrical discharge machining apparatus can be operated effectively, increasing the effective operating time thereof.

Figure 5:
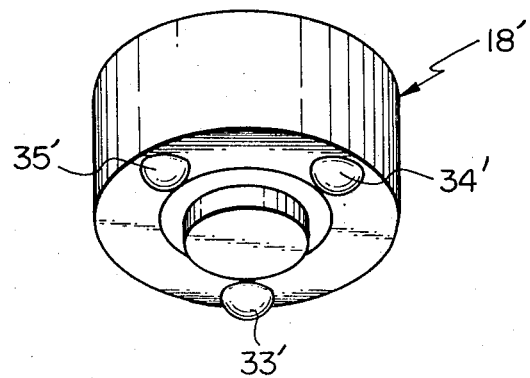
FIG. 5 is a perspective view of another form of the fixed member.

Although the positioning projections are formed in truncated conical shapes in the embodiment as mentioned above, there may be employed a fixed coupling member 18' having semi-spherical positioning projections 33', 34' and 35' formed at angular intervals of 120° as illustrated in FIG. 5 and matable with V-shaped grooves respectively. Where the fixed coupling member 18' is employed in place of the fixed coupling member 18, the aforesaid advantages of the present invention are by no means reduced.

Figure 6:
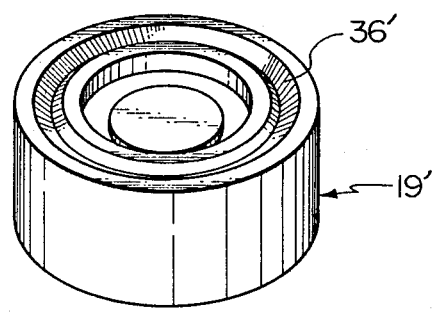
FIG. 6 is a perspective view of another form of the removable member.

A groove for receiving the positioning projection is not always required to be the V-shaped groove formed radially at angular intervals of 120° as illustrated in FIG. 4, but it may for example be an annular groove 36' as illustrated in FIG. 6.

Although the positioning projections are provided on the fixed coupling member and the groove or grooves for receiving the projections therein are formed on the removable coupling member in the foregoing embodiments, the positioning projections may be formed on the removable coupling member and the groove or grooves for receiving the projections may be formed on the fixed coupling member.

According to the electrode mounting device of the present invention, since high processing accuracy is not necessarily required for the mating portions, manufacturing of the coupling members can be facilitated very much and since the coupling members have a self-aligning force, setting of the members becomes easy.

What is claimed is:

1. A self-aligning electrode mounting device in an electrical discharge machining apparatus comprising first and second coupling members, one of which is fixed to the electrical discharge machining apparatus in a predetermined positional relation thereto, and the other coupling member of which is mounted on a machining electrode in a predetermined positional relation thereto, the first and second coupling members having self-aligning means for coupling together with a self-aligning force for self-aligning the first and second coupling members during coupling to precisely locate and position the machining electrode on the electrical discharge machining apparatus, the first coupling member comprising self-aligning positioning projections, each projection extending from its own round base on the first coupling member and having a curved side wall extended toward the second coupling member, and the second coupling member having groove means with side walls sloping inward in a direction away from the first coupling member, whereby curved side walls of the projections fit within inward sloping side walls of the groove means and provide self-aligning forces between the curved walls of the first coupling member and the sloped walls of the groove means of the second coupling member.

2. The electrode mounting device of claim 1 wherein the projections have truncated conical shapes with conical curved side walls.

3. The electrode mounting device of claim 1 wherein the projections have semi-spherical shapes with semi-spherical side walls.

4. The electrode mounting device of claim 1 wherein the groove means comprises plural radial grooves positioned opposite the projections.

5. The electrode mounting device of claim 1 wherein the groove means comprises an annular groove positioned opposite the projections.

* * * * *